United States Patent
Cheng et al.

(10) Patent No.: US 11,074,336 B2
(45) Date of Patent: Jul. 27, 2021

(54) THRESHOLD DETERMINING AND IDENTITY VERIFICATION METHOD, APPARATUS, ELECTRONIC DEVICE, AND STORAGE MEDIUM

(71) Applicant: Advanced New Technologies Co., Ltd., Grand Cayman (KY)

(72) Inventors: Yu Cheng, Hangzhou (CN); Tao Chen, Hangzhou (CN); Yicheng Lu, Hangzhou (CN); Xin Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,261

(22) Filed: Oct. 30, 2020

(65) Prior Publication Data

US 2021/0049259 A1    Feb. 18, 2021

Related U.S. Application Data

(63) Continuation of application No. PCT/CN2019/092655, filed on Jun. 25, 2019.

(30) Foreign Application Priority Data

Aug. 22, 2018   (CN) .......................... 201810961484.4

(51) Int. Cl.
*G06F 21/00*    (2013.01)
*G06F 21/45*    (2013.01)
(Continued)

(52) U.S. Cl.
CPC ............ *G06F 21/45* (2013.01); *G06F 21/316* (2013.01); *G06F 21/577* (2013.01)

(58) Field of Classification Search
CPC ........ G06F 21/30; G06F 21/31; G06F 21/316; G06F 21/45; G06F 21/50; G06F 21/46; G06F 21/57; G06F 21/577
See application file for complete search history.

(56) References Cited

U.S. PATENT DOCUMENTS

| | | |
|---|---|---|
| 8,590,018 B2 | 11/2013 | Thavasi et al. |
| 9,331,994 B2 | 5/2016 | Grigg et al. |
| 2012/0180116 A1* | 7/2012 | Sagi ........................ H04L 63/08 |
| | | 726/7 |

FOREIGN PATENT DOCUMENTS

| | | |
|---|---|---|
| CN | 102542687 | 7/2012 |
| CN | 104318138 | 1/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Edward Zee
(74) *Attorney, Agent, or Firm* — Fish & Richardson P.C.

(57) ABSTRACT

Embodiments of the present disclosure disclose identity verification methods, apparatuses, electronic devices, and storage media. In an embodiment, an identity verification method includes: receiving an identity verification request for verifying an identity of a user; determining that the user is an inactive user based on a user service variable value; determining at least one risk level of the user based on at least one user identification method; and determining a user identity verification method based on the at least one risk level and at least one identity verification threshold corresponding to the at least one user identification method, (Continued)

wherein the user identity verification method is one of a strong user identity verification method or a weak user identity verification method.

18 Claims, 5 Drawing Sheets

(51) Int. Cl.
*G06F 21/31* (2013.01)
*G06F 21/57* (2013.01)

(56) References Cited

FOREIGN PATENT DOCUMENTS

| CN | 104580091 | 4/2015 |
|---|---|---|
| CN | 105229596 | 1/2016 |
| CN | 105591747 | 5/2016 |
| CN | 106096585 | 11/2016 |
| CN | 106453205 | 2/2017 |
| CN | 106845999 | 6/2017 |
| CN | 106875185 | 6/2017 |
| CN | 106910057 | 6/2017 |
| CN | 107018119 | 8/2017 |
| CN | 107104973 | 8/2017 |
| CN | 107644155 | 1/2018 |
| CN | 107645482 | 1/2018 |
| CN | 107800680 | 3/2018 |
| CN | 107872444 | 4/2018 |
| CN | 108171033 | 6/2018 |
| CN | 108173864 | 6/2018 |
| CN | 109344583 | 2/2019 |
| WO | WO2011087648 | 7/2011 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/092655, dated Sep. 16, 2019, 9 pages (with partial English translation).

PCT International Preliminary Report on Patentability in International Application No. PCT/CN2019/092655, dated Feb. 23, 2021, 9 pages (with English translation).

* cited by examiner

THRESHOLD DETERMINING AND IDENTITY VERIFICATION METHOD, APPARATUS, ELECTRONIC DEVICE, AND STORAGE MEDIUM

CROSS-REFERENCE TO RELATED APPLICATIONS

This application is a continuation of PCT Application No. PCT/CN2019/092655, filed on Jun. 25, 2019, which claims priority to Chinese Patent Application No. 201810961484.4, filed on Aug. 22, 2018, and each application is hereby incorporated by reference in its entirety.

TECHNICAL FIELD

The present disclosure relates to the field of computer technologies, and specifically, to threshold determining and identity verification methods, apparatuses, electronic devices, and storage media.

BACKGROUND

A modern risk control system requires higher system security and user experience. As an important means and basis for risk control decision-making, identity verification has become an important part of risk control. Commonly used identity verification apparatuses are usually supported by multiple products, including SMS verification, ID number, bank card binding, KBA question and answer, biometric identity verification, etc. Regarding control strength of identity verification, various verification methods are divided into a strong verification method and a weak verification method. In addition, in the financial field, to ensure user security, identity verification is usually performed for multiple times in a superimposition way.

Identity verification is like a double-edged sword. In a high-strength verification method, users with abnormal behavior are rejected while some disturbance to normal users is also caused. In a low-strength verification method, risk is spread, and some users feel insecure. In most of current identity verification methods for password modification, verification is performed by using single identity verification strength, without taking into account diversity of identity verification demands resulting from individual differences among users. For example, some users do not like to be strongly verified, and if strong verification is always performed, a user loss may be eventually caused due to bad experience. Some users do not like to be weakly verified because the users consider that in this weak verification method, hackers can easily intrude into personal accounts, and this is insecure. A scenario of modifying a password is used as an example. When a user forgets an account password, the user is usually allowed to reset the password or obtain the original password only when a system verifies, through identity verification, that it is the user that currently performs an operation.

SUMMARY

Embodiments of the present disclosure provide threshold determining and identity verification methods, apparatuses, electronic devices, and computer-readable storage media.

According to a first aspect, an embodiment of the present disclosure provides a threshold determining method, including: obtaining predetermined target values respectively corresponding to multiple identification models for identity verification, where the predetermined target values are used to indicate expected target identification capabilities of the identification models for identity verification; and determining user service variable values and identity verification thresholds respectively corresponding to the multiple identification models for identity verification based on the predetermined target values, where the user service variable values are used for classification of active users and inactive users, and the identity verification thresholds are used by the identification models for identity verification to exclude users who need strong verification from the inactive users.

Further, the determining user service variable values and identity verification thresholds respectively corresponding to the multiple identification models for identity verification based on the predetermined target values includes: determining the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values.

Further, the determining the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values includes: constructing a solution vector by using the user service variable values and the identity verification thresholds respectively corresponding to the multiple identification models for identity verification; and solving the above mentioned solution vector based on using maximizing the range of inactive users identified based on the user service variable values as a condition of the optimization algorithm and by using an objective function, of the optimization algorithm, that the identity verification thresholds corresponding to the multiple identification models for identity verification are less than the predetermined target values corresponding to the multiple identification models for identity verification.

Further, the identification models for identity verification include a misappropriation risk identification model, a sense of security identification model, and/or a password modification motivation abnormality identification model, the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

According to a second aspect, an embodiment of the present disclosure provides an identity verification method, including: determining, based on user service variable values in response to an identity verification request, whether a user to be verified is an inactive user; determining an identification result of at least one of multiple identification models for identity verification for the user to be verified when the user to be verified is an inactive user; determining an identity verification method of the user to be verified based on the identification result of the identification model for identity verification and an identity verification threshold corresponding to the identification model for identity verification, where the identity verification method includes a weak identity verification method and a strong identity verification method, and the user service variable values and the identity verification threshold are obtained by using the previous threshold determining method; and performing identity verification on the user to be verified by using the identity verification method.

Further, the identification models for identity verification include a misappropriation risk identification model, a sense of security identification model, and/or a password modification motivation abnormality identification model, the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

Further, the determining an identity verification method of the user to be verified based on the identification result of the identification model for identity verification and an identity verification threshold corresponding to the identification model for identity verification includes: determining a first identity verification method of the user to be verified based on a first identification result and an identity verification threshold corresponding to the misappropriation risk identification model, determining a second identity verification method of the user to be verified based on a second identification result and an identity verification threshold corresponding to the sense of security identification model, and determining a third identity verification method of the user to be verified based on a third identification result and an identity verification threshold corresponding to the password modification motivation abnormality identification model, where the first identification result, the second identification result, and the third identification result are respectively identification results of the misappropriation risk identification model, the sense of security identification model, and the password modification motivation abnormality identification model for the user to be verified; and determining that the identity verification method of the user to be verified is the weak identity verification method when each of the first identity verification method, the second identity verification method, and the third identity verification method is the weak identity verification method.

Further, the determining an identity verification method of the user to be verified based on the identification result and a corresponding identity verification threshold further includes: determining that the identity verification method of the user to be verified is the strong identity verification method when at least one of the first identity verification method, the second identity verification method, and the third identity verification method is the strong identity verification method.

According to a third aspect, an embodiment of the present disclosure provides a threshold determining apparatus, including: an acquisition module, configured to obtain predetermined target values respectively corresponding to multiple identification models for identity verification, where the predetermined target values are used to indicate expected target identification capabilities of the identification models for identity verification; and a first determining module, configured to determine user service variable values and identity verification thresholds respectively corresponding to the multiple identification models for identity verification based on the predetermined target values, where the user service variable values are used for classification of active users and inactive users, and the identity verification thresholds are used by the identification models for identity verification to exclude users who need strong verification from the inactive users.

Further, the first determining module includes: an optimization submodule, configured to determine the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values.

Further, the previously described optimization submodule includes: a construction submodule, configured to construct a solution vector by using the user service variable values and the identity verification thresholds respectively corresponding to the multiple identification models for identity verification; and a solution submodule, configured to solve the solution vector based on using maximizing the range of inactive users identified based on the user service variable values as a condition of the optimization algorithm, and by using an objective function, of the optimization algorithm, that the identity verification thresholds corresponding to the multiple identification models for identity verification are less than the predetermined target values corresponding to the multiple identification models for identity verification.

Further, the identification models for identity verification include a misappropriation risk identification model, a sense of security identification model, and/or a password modification motivation abnormality identification model, the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

The above mentioned functions can be implemented by hardware or by hardware executing corresponding software. The hardware or software includes one or more modules corresponding to the previous functions.

In a possible design, the structure of the threshold determining apparatus includes a memory and a processor. The memory is configured to store one or more computer instructions for supporting the threshold determining apparatus in performing the threshold determining method in the first aspect, and the processor is configured to execute the computer instructions stored in the memory. The threshold determining apparatus can further include a communication interface used by the threshold determining apparatus to communicate with other devices or a communications network.

According to a fourth aspect, an embodiment of the present disclosure provides an identity verification apparatus, including: a second determining module, configured to determine, based on user service variable values in response to an identity verification request, whether a user to be verified is an inactive user; a third determining module, configured to determine an identification result of at least one of multiple identification models for identity verification for the user to be verified when the user to be verified is an inactive user; a fourth determining module, configured to determine an identity verification method of the user to be verified based on the identification result of the identification model for identity verification and an identity verification threshold corresponding to the identification model for identity verification, where the identity verification method includes a weak identity verification method and a strong identity verification method, and the user service variable values and the identity verification threshold are obtained by using the previous threshold determining apparatus; and an identity verification module, configured to perform identity verification on the user to be verified by using the identity verification method.

Further, the identification models for identity verification include a misappropriation risk identification model, a sense of security identification model, and/or a password modification motivation abnormality identification model, the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

Further, the fourth determining module includes: a first determining submodule, configured to determine a first identity verification method of the user to be verified based on a first identification result and an identity verification threshold corresponding to the misappropriation risk identification model, determine a second identity verification method of the user to be verified based on a second identification result and an identity verification threshold corresponding to the sense of security identification model, and determine a third identity verification method of the user to be verified based on a third identification result and an identity verification threshold corresponding to the password modification motivation abnormality identification model, where the first identification result, the second identification result, and the third identification result are respectively identification results of the misappropriation risk identification model, the sense of security identification model, and the password modification motivation abnormality identification model for the user to be verified; and a second determining submodule, configured to determine that the identity verification method of the user to be verified is the weak identity verification method when each of the first identity verification method, the second identity verification method, and the third identity verification method is the weak identity verification method.

Further, the fourth determining module further includes: a third determining submodule, configured to determine that the identity verification method of the user to be verified is the strong identity verification method when at least one of the first identity verification method, the second identity verification method, and the third identity verification method is the strong identity verification method.

The functions can be implemented by hardware or by hardware executing corresponding software. The hardware or software includes one or more modules corresponding to the previous functions.

In a possible design, the structure of the identity verification apparatus includes a memory and a processor. The memory is configured to store one or more computer instructions for supporting the identity verification apparatus in performing the identity verification method in the second aspect, and the processor is configured to execute the computer instructions stored in the memory. The identity verification apparatus can further include a communications interface used by the identity verification apparatus to communicate with other devices or a communications network.

According to a fifth aspect, an embodiment of the present disclosure provides an electronic device, including a memory and a processor, where the memory is configured to store one or more computer instructions, and the one or more computer instructions are executed by the processor to implement the steps of the method according to the first aspect or the second aspect.

According to a sixth aspect, an embodiment of the present disclosure provides a computer-readable storage medium, configured to store a computer instruction used by a threshold determining apparatus or an identity verification apparatus, where the computer-readable storage medium includes a computer instruction used to perform the threshold determining method in the first aspect or the identity verification method in the second aspect.

The technical solutions provided in some embodiments of the present disclosure can achieve the following beneficial effects:

In some embodiments of the present disclosure, in the identity verification process, to achieve a balance between identification results of the multiple different identification models for identity verification for identity verification methods of users, the target identification capabilities to be achieved by the multiple different identification models for identity verification are obtained, and the user service variable values used for classification of active users and inactive users and the identity verification thresholds of the identification models for identity verification are determined based on the target identification capabilities, so that the users at risk can be identified from the inactive users while the range of inactive users is maximized. As such, weak identity verification demands of inactive users can be satisfied, and the users who need strong identity verification can be identified from the inactive users, which can achieve a balance between user experience and risk control.

It should be understood that the previous general description and the following detailed description are merely illustrative and explanatory, and constitute no limitation on the present disclosure.

BRIEF DESCRIPTION OF DRAWINGS

With reference to the accompanying drawings, other features, objectives, and advantages of the present disclosure become clearer from the following detailed description of non-limiting embodiments. In the accompanying drawings.

DESCRIPTION OF EMBODIMENTS

Example embodiments of the present disclosure are described below in detail with reference to the accompanying drawings, so that a person skilled in the art can easily implement the embodiments. In addition, for clarity, parts irrelevant to description of the example embodiments are omitted in the accompanying drawings.

In the present disclosure, it should be understood that terms such as "include" or "have" are intended to indicate existence of features, numbers, steps, actions, components, parts, or combinations thereof disclosed in the present specification, and are not intended to exclude the possibility of existence or addition of one or more other features, numbers, steps, actions, components, parts, or combinations thereof.

In addition, it is worthwhile to further note that some embodiments of the present disclosure and features in some embodiments can be combined with each other provided that there is no conflict. The present disclosure is described below in detail with reference to the accompanying drawings and embodiments.

Regarding strength of identity verification, there are three main problems to be alleviated. The first problem is that priority is given to what kind of users. For example, to encourage new users to use a product, it is expected to perform high-experience identity verification on the new users or less active users, and therefore one-factor identity verification is performed on those users. The second problem is whether users on which simple identity verification is currently performed are at risk. For example, it is expected to perform one-factor weak verification only on current accounts identified as secure accounts. For example, a user who wants to modify a password is required to provide an ID number or a mobile phone SMS verification code to complete verification. Multiple-factor strong verification is performed on accounts with uncertain security. For example, in addition to an SMS verification code provided by a user, face verification is needed. The third problem is how to maximize the proportion of priority users in a given risk range, in other words, how to better serve users by improving user experience. Some embodiments of the present disclosure provide a threshold determining method, which can automatically adjust, by using some conditions, the proportion of users on which weak verification such as one-factor identity verification is to be performed, to achieve a balance between user experience and risk control. For example, under the same case concentration condition, in existing solutions, only 5% of users may be allowed to experience weak verification such as simple and convenient one-factor identity verification. However, 10% of users can be allowed to experience one-factor identity verification by using a user service variable and an identity verification threshold obtained by using the threshold determining method provided in some embodiments of the present disclosure.

Figure 1:
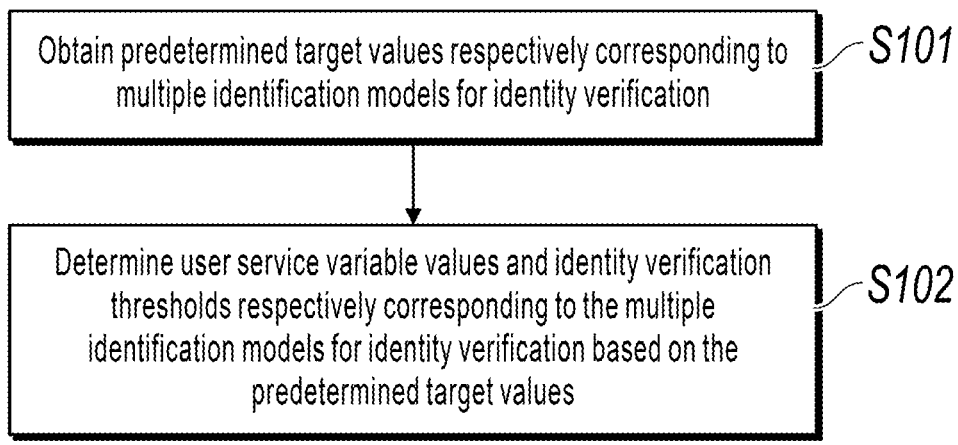
FIG. 1 is a flowchart illustrating a threshold determining method, according to an embodiment of the present disclosure.

FIG. 1 is a flowchart illustrating a threshold determining method, according to an embodiment of the present disclosure. As shown in FIG. 1, the threshold determining method includes the following steps S101 and S102:

Step S101: Obtain predetermined target values respectively corresponding to multiple identification models for identity verification, where the predetermined target values are used to indicate expected target identification capabilities of the identification models for identity verification.

Step S102: Determine user service variable values and identity verification thresholds respectively corresponding to the multiple identification models for identity verification based on the predetermined target values, where the user service variable values are used for classification of active users and inactive users, and the identity verification thresholds are used by the identification models for identity verification to exclude users who need strong verification from the inactive users.

In the present embodiment, the identification model for identity verification can identify, based on a feature of a user and/or a feature of an account, whether there is an identity verification risk for the account of the user. If there is an identity verification risk, strong identity verification is used. Otherwise, weak identity verification is used. That is, the identification model for identity verification is used to identify whether strong verification or weak verification is used to perform identity verification on the account of the user. Strong identity verification refers to a method in which multiple factors are used to verify an identity of a user. Weak identity verification refers to a method in which a single factor or few factors is or are used to verify an identity of a user. The number of factors used in weak identity verification is less than the number of factors used in strong identity verification, and verification strength of weak identity verification is lower than that of strong identity verification. For example, in weak identity verification, factors such as an ID number or a mobile phone SMS verification code are used for verification while in strong identity verification, in addition to an ID number and/or a mobile phone SMS verification code, strong factors such as a face are further used.

The multiple identification models for identity verification can identify an account of a user from multiple different aspects. That is, different identification models for identity verification can identify different identity verification risks of an account based on different features of a user and/or the account, for example, a model for identifying whether an account is misappropriated, a model for identifying a sense of security of a user (there is an identity verification risk if the user has a strong sense of security), and a model for identifying password modification motivation abnormality of a user. The identification model for identity verification can score the account of the user based on the feature of the user and/or the account, and determines the potential risk of the account based on scoring.

The predetermined target value can be a predetermined value related to the target identification capability to be achieved by the identification model for identity verification. That is, the predetermined target value can be considered as a desired value for identification accuracy or an identification error rate of the identification model for identity verification. In an embodiment, the predetermined target value can be desired accuracy of the identification model for identifying users at risk from a plurality of users. In another embodiment, the predetermined target value can be a desired error rate at which the identification model for identity verification cannot identify users at risk from many users. Regardless of whether the predetermined target value is the target identification accuracy or the target identification error rate, the predetermined target value is used to indicate a target desired value of the identification capability of the identification model for identity verification. The predetermined target value can be predetermined based on service experience, a service demand, etc. For example, when a current service involves an account, such as finance, with a high security level, a predetermined target value can be set so as to improve the identification capability of the identification model for identity verification. If a current service involves only an account, such as a forum, with a low security level, another predetermined target value can be set so as to lower the identification capability of the identification model for identity verification.

In the present embodiment, the user service variable values can be used to measure active degrees of users, and users in a current service system can be classified as active users and inactive users. The active users can be users who often perform some operations such as browsing, publishing an article, shopping, and making a payment in the current service system, and the inactive users can be users who have never performed any operations in the current service system or who have performed operations less frequently in a recent period of time. For example, in a third-party payment system, the user service variable values can be set to the number of payments made by users. Larger user service variable values indicate a larger proportion of inactive users, and smaller user service variable values indicate a smaller proportion of inactive users.

In the present embodiment, the identity verification threshold is a threshold of a model score output by the identification model for identity verification. For example, when the identity verification threshold is determined, and the identification model for identity verification is used to identify a user, if an output model score is less than (or greater than) the identity verification threshold, it is considered that the user is not a user at risk, and a weak identity verification method can be used. If the output model score is greater than or equal to (or less than or equal to) the identity verification threshold, it is considered that the user is a user at risk, and a strong identity verification method can be used. A value of the identity verification threshold is related to the proportion of users at risk identified by the identification model for identity verification, and is also related to the identification error rate or the identification accuracy of the identification model for identity verification. A larger identity verification threshold indicates a smaller (or larger) proportion of identified users at risk and a higher identification error rate (or a lower identification error rate), and a smaller identity verification threshold indicates a larger (or smaller) proportion of identified users at risk and a lower identification error rate (or a higher identification error rate). Whether the identity verification threshold is directly or inversely proportional to the proportion of users at risk identified by the identification model for identity verification or the identity verification threshold is directly or inversely proportional to the identification error rate (or the identification accuracy) of the identification model for identity verification can be set based on an actual situation. Implementations are not limited.

The user service variable values are used for classification of active users and inactive users. Identity verification methods can include strong identity verification and weak identity verification. To provide better user experience, a common simple method is to use weak verification for inactive users and strong verification for active users. However, there may be some potential risks in such a one-size-fits-all method. Password modification is used as an example, and accounts of inactive users may be at risk of misappropriation. If the weak identity verification method is used for all of the inactive users, there may be a risk of misappropriation. Therefore, in the present embodiment of the present disclosure, the inactive users are selected by using the user service variable values (for example, the user service variable values are set to the number of payments made by users within a certain period of time, and if the number of payments is less than a specified value, the user can be considered as an inactive user), then, the users at risk are excluded from the inactive users by using the identification models for identity verification and the identity verification thresholds corresponding to the identification models for identity verification (that is, whether the inactive users are at risk is identified, and a strong verification method is used if there is a risk), and finally, weak verification is performed on the remaining inactive users.

In the existing technology, identity verification thresholds of different identification models for identity verification and the user service variable values are determined separately through experience, testing, etc., and user identification by the different identification models for identity verification is independent of each other. In the present embodiment of the present disclosure, to provide more users with such a high-experience service of weak verification and to minimize risks, the predetermined target values of the identification models for identity verification are predetermined, and the user service variable values and the identity verification thresholds of the identification model for identity verification are determined by using these predetermined target values, so that a range of inactive users for which the weak identity verification method is to be used is maximized while the identification capabilities of the identification models for identity verification can satisfy the predetermined target values. In the present embodiment of the present disclosure, the user service variable values and the identity verification thresholds are determined by using the predetermined target values. As such, the multiple identification models for identity verification and classification of users at risk based on the user service variable values are considered, and a balance is achieved between the identification models for identity verification, which can improve user experience.

In the present embodiment of the present disclosure, in the identity verification process, to achieve a balance between identification results of the multiple different identification models for identity verification for identity verification methods of users, the target identification capabilities to be achieved by the multiple different identification models for identity verification are obtained, and the identity verification thresholds of the identification models for identity verification and the user service variable values used for classification of active users and inactive users are determined based on the target identification capabilities, so that the users at risk can be identified from the inactive users while the range of inactive users is maximized. As such, weak identity verification demands of inactive users can be satisfied, and the users who need strong identity verification can be identified from the inactive users, which can achieve a balance between user experience and risk control.

In an optional embodiment of the present embodiment, step S103, namely, the step of determining user service variable values and identity verification thresholds respectively corresponding to the multiple identification models for identity verification based on the predetermined target values further includes the following step: determining the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values.

In this optional embodiment, more users are allowed to enjoy the high-experience service of weak identity verification, and it can be ensured as much as possible that users who enjoy the weak identity verification service are risk-free users (the risk-free users can be understood as users who should use strong verification, for example, users who misappropriate accounts of others and users who need strong verification due to lack of a sense of security). To achieve a balance between a high user experience and a low risk, in the present embodiment of the present disclosure, the predetermined target value of each identification model for identity verification is predetermined. The predetermined target value is used to indicate the expected identification capability of the identification model for identity verification, and the identification capability of the trained identification model for identity verification can be adjusted by using the identity verification threshold. The identification model for identity verification identifies a feature of a user and/or a feature of a user account to yield a model score, and a value of the model score is related to a risk level of the user. The identity verification threshold can be set to be between a maximum value and a minimum value of the model score. When a higher model score indicates a higher risk level of the user, a larger identity verification threshold is set, and the identification model for identity verification has a poorer identification capability (or when a higher model score indicates a lower risk level of the user, a smaller identity verification threshold is set, and the identification model for identity verification has a poorer identification capability). On contrary, when a smaller identity verification threshold is set, the identification model for identity verification has a higher identification capability. Therefore, an optimal identity verification threshold can be found for the identification model for identity verification, so that the identification capability of the identification model for identity verification can be as close to the predetermined target value as possible. In the present disclosure, the multiple identification models for identity verification are used to identify inactive users, and it is expected to provide more inactive users with the weak identity verification service. Therefore, the identity verification threshold of the identification model for identity verification is neither simply set to the predetermined target value, nor the user service variable values are directly set through experience, statistics collection, etc. Instead, the user service variable values and the multiple identity verification thresholds respectively corresponding to the multiple identification models for identity verification are optimized by using the optimization algorithm, and optimized user service variables value and multiple optimized identity verification thresholds can achieve a balance between user experience and a low risk level of a user.

In the present embodiment of the present disclosure, the process of optimizing the user service variable values and the multiple identity verification thresholds respectively corresponding to the multiple identification models for identity verification, minimizing the differences between the identity verification thresholds and the corresponding predetermined target values and maximizing the range of inactive users identified based on the user service variable values are used as an objective of the optimization algorithm, the user service variable values and the identity verification thresholds are obtained through optimization by using the optimization algorithm. In an embodiment, the optimization algorithm can be a particle swarm optimization (PSO) algorithm. The PSO algorithm is a swarm-based stochastic optimization technology, and simulates the swarm behavior of insects, beasts, birds, fishes, etc. These groups look for food in a cooperative way. Each member of the group changes its search pattern based on its own experience and experience of other members. That is, in the present disclosure, the PSO algorithm is used, the user service variable values, different values of an objective function that includes the identity verification thresholds are used as particles in a swarm, and an optimal value of each particle in target space is optimized through continuous iteration. In each iteration process, an optimal value of a particle is identified from both the perspective of the swarm and the perspective of the individual, and finally, an optimal value of the particle in the target space from both the perspective of the swarm and the perspective of the individual is identified. Based on the user service variable values and the identity verification thresholds obtained through optimization by using this algorithm, the range of inactive users who are to use weak identity verification can be maximized, and users at risk can be identified from the inactive users. Therefore, a balance is achieved between user experience and account risk.

In other embodiments, other optimization algorithms for alleviating similar problems, for example, an ant colony optimization (ACO) algorithm and a differential evolution algorithm, can be used, and can be selected based on actual situations. Implementations are not limited here.

Figure 2:
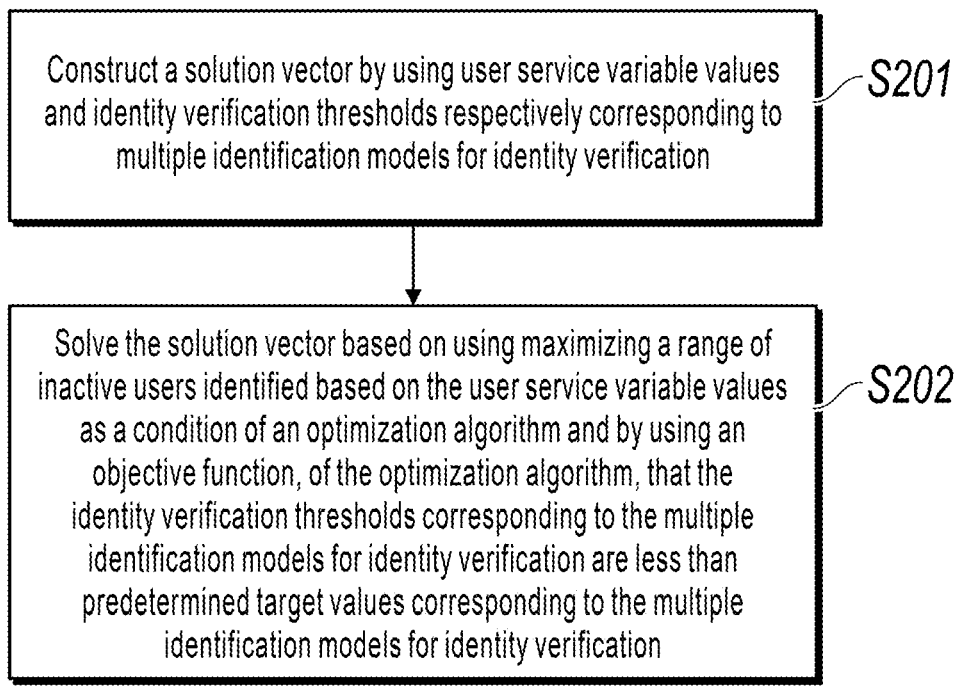
FIG. 2 is a flowchart illustrating an optimization algorithm in a threshold determining method, according to an embodiment of the present disclosure.

In an optional embodiment of the present embodiment, as shown in FIG. 2, the step of determining the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values further includes the following steps S201 and S202:

Step S201: Construct a solution vector by using the user service variable values and the identity verification thresholds respectively corresponding to the multiple identification models for identity verification; and Step S202: Solve the solution vector based on using maximizing the range of inactive users identified based on the user service variable values as a condition of the optimization algorithm and by using an objective function, of the optimization algorithm, that the identity verification thresholds corresponding to the multiple identification models for identity verification are less than the predetermined target values corresponding to the multiple identification models for identity verification.

In this optional embodiment, the solution vector can be constructed by using the user service variable values and the identity verification thresholds corresponding to the identification models for identity verification as variables. For example, the user service variable values are denoted as C, and the identity verification threshold of the identification model i for identity verification is denoted as $Y_i$ ($i \geq 1$). In this case, the solution vector can be denoted as $S=[C, Y_1, Y_2, \ldots, Y_i, \ldots]$. After the optimization algorithm is selected, maximizing the range of inactive users identified based on the user service variable values is used as the condition of the optimization algorithm, and that the multiple identity verification thresholds are less than the corresponding predetermined target values is used as the objective function, and the user service variable values and the identity verification thresholds are determined by executing the optimization algorithm. In the execution process of the optimization algorithm, under the premise that the maximization of user service variable values is ensured (this is suitable for a case in which larger user service variable values indicate a wider range of inactive users identified. On the contrary, when smaller user variable values indicate a narrower range of inactive users identified, minimizing the user service variable values needs to be used as the condition), each identity verification threshold is less than the predetermined target value, and is infinitely close to the predetermined target value. For example, when the PSO algorithm is used for optimization, if the constructed vector is $S=[C, Y1, Y2, \ldots, Yi, \ldots]$, an adaptive value function can be constructed as $p=C-(Y1-y1)-(Y2-y2)-\ldots-(Yi-yi)-\ldots$ (This is merely an example, and the function can be constructed based on an actual situation), where $y1$, $y2, \ldots, yi, \ldots$ respectively represent predetermined target values of identification models $1, 2, \ldots, i, \ldots$ for identity verification. In the PSO optimization algorithm, a value of p is identified, so that the value is optimal in both a group and the individual. After p is updated by using an update function, the previous step is iteratively performed until an iteration termination condition (for example, the number of iterations reaches a predetermined threshold) is reached. Finally obtained C and Yi corresponding to p are optimal solutions to the user service variable values and the identity verification threshold.

In an optional embodiment of the present embodiment, the identification models for identity verification include a misappropriation risk identification model, a sense of security identification model, and/or a password modification motivation abnormality identification model, where the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

In the present embodiment, the misappropriation risk identification model can be a real-time identification model, and is mainly used for risk identification of current password modification behavior of a user. If a risk is identified, strong identity verification is performed on the user who wants to modify a password. The sense of security identification model can be an offline identification model, and can identify a user by using a T+1 method (for example, the user is identified by using some user features before a current identification time). If a user is identified as a high-risk user, it indicates that the user has a demand for a sense of security, and strong identity verification needs to be used to enhance the sense of security of the user. The password modification motivation abnormality identification model can identify, in real time, whether the current password modification behavior is appropriate. For example, when the user has actually made a payment by using a password, if the user modifies the password on the same day, the motivation is inappropriate, and strong identity verification should be used. Both the misappropriation risk identification model and the sense of security identification model can be built through supervised learning such as GBDT, RandomForest, and logistic regression. The password modification motivation abnormality identification model can be an unsupervised learning model. A risk can be identified by describing behavior abnormality such as one-class SVM. Through the combination of one or more of the previous three identification models for identity verification, the users at risk can be excluded from the inactive users. As such, risk problems brought by weak identity verification are alleviated while it is ensured that more inactive users enjoy the weak verification service.

The misappropriation risk identification model identifies a user by using a misappropriation risk feature of the user. The misappropriation risk feature is used to describe a variable within the model for account misappropriation risks, for example, to describe abnormality in the device dimension, the environment dimension and the user operation dimension, or various other aspects.

The sense of security identification model identifies a user by using a sense of security risk feature. The sense of security risk feature is used to describe a demand of the user for a sense of security, and can include two types. One type is a text feature such as a historical incoming call feedback or text feedback of the user. The other type is a behavioral feature such as a feature indicating whether the user has a historical habit of periodically modifying a password and a feature indicating whether the user performs unbinding after card binding.

The password modification motivation abnormality identification model identifies a user by using a password modification motivation feature. The password modification motivation feature describes whether the user really forgets a password, and for example, can include behavioral features such as a feature indicating whether a payment has been made by using the password in a short time before current password modification and a feature indicating that password modification has been made for multiple accounts on the same device.

The user service variable values and the features needed by the identification models for identity verification to perform identity verification on the users can be obtained from the following data: user information data, historical transaction data, historical case information, and public opinion information.

The user information data includes user information such as a user ID, a user registration time, and a user identity card.

The historical transaction data includes historical transactions of a user, including a transaction number, a transaction time, and an amount corresponding to a user ID. Detailed information such as a transaction device, an IP, and Wi-Fi at a transaction moment can be obtained through underlying association.

The historical case information includes information about a user on a misappropriation case, a sense of security questionnaire, etc. Account misappropriation means that an account is operated by an unauthorized user for a payment, and the authorized user makes a complaint or reports a case after finding account misappropriation. This part of data is usually used as sample labels for supervised learning during modeling. The security questionnaire is a sampling or directional data survey conducted to obtain a demand of a user for a sense of security. Like the misappropriation case information, the security questionnaire is usually used as sample labels for supervised learning during modeling.

The public opinion information includes features of main users who historically trigger public opinion and features of public opinion about the users, for example, incoming call feedbacks of the users or behavioral data, features such as attempting to modify a password, unbinding bank card, and deleting friends, of the users in this period of time.

Figure 3:
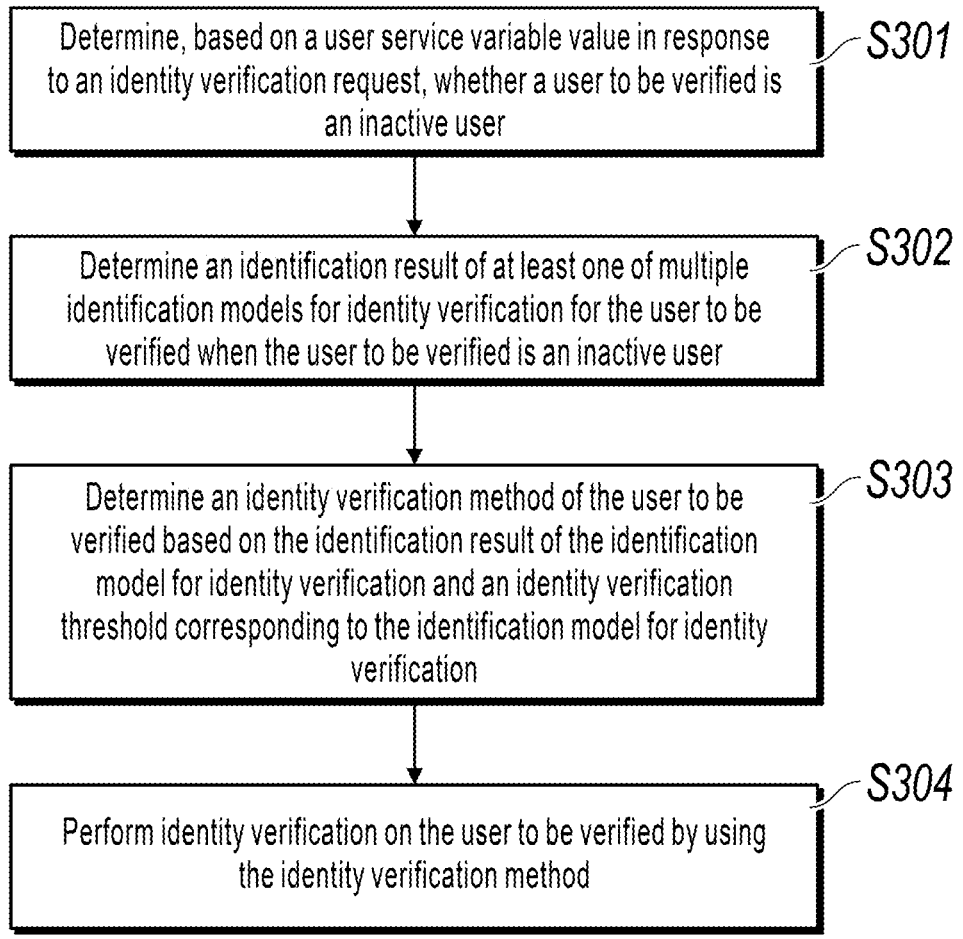
FIG. 3 is a flowchart illustrating an identity verification method, according to an embodiment of the present disclosure.

FIG. 3 is a flowchart illustrating an identity verification method, according to an embodiment of the present disclosure. As shown in FIG. 3, the identity verification method includes the following steps S301 to S304:

Step S301: Determine, based on user service variable values in response to an identity verification request, whether a user to be verified is an inactive user.

Step S302: Determine an identification result of at least one of multiple identification models for identity verification for the user to be verified when the user to be verified is an inactive user.

Step S303: Determine an identity verification method of the user to be verified based on the identification result of the identification model for identity verification and an identity verification threshold corresponding to the identification model for identity verification, where the identity verification method includes a weak identity verification method and a strong identity verification method, and the user service variable values and the identity verification threshold are obtained by using the previous threshold determining method.

Step S304: Perform identity verification on the user to be verified by using the identity verification method.

In the present embodiment, after the user service variable values and the identity verification threshold of the identification model for identity verification are obtained by using the threshold determining method, if the request for performing identity verification on a user account is received, whether the user to be verified is an inactive user can be first determined by using the user service variable values, and if the user to be verified is an inactive user, the user is identified by using the identification model for identity verification to determine whether the user is a user at risk in inactive users. Password modification behavior is used as an example to determine whether the user who is currently requesting to modify a password is stealing the account. For another example, it is determined whether the current user to be verified is a user who has a high demand for a sense of security and does not want weak verification to be performed. The identification model for identity verification scores the user to be verified for a feature corresponding to the user, and whether the user to be verified is at risk is determined by comparing a score with the identity verification threshold corresponding to the identification model for identity verification. If there is a risk, the strong identity verification method is used. If identification results of the one or more used identification models for identity verification for the user to be verified all show that the user to be verified is not at risk, the weak identity verification method is used.

For some technical details of the present embodiment, references can be made to the description in the threshold determining method, and details are omitted here for simplicity.

In the present embodiment of the present disclosure, the user is identified by using the user service variable values and the identity verification threshold obtained through optimization by using the threshold determining method and the identification model for identity verification, to determine whether to use the strong identity verification method or the weak identity verification method for the user. In this method, users at risk can be identified from the inactive users while a range of inactive users can be maximized. As such, weak identity verification demands of inactive users can be satisfied, and users who need strong identity verification can be identified from the inactive users, which can achieve a balance between user experience and risk control.

In an optional embodiment of the present embodiment, the identification models for identity verification include a misappropriation risk identification model, a sense of security identification model, and/or a password modification motivation abnormality identification model, where the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

In this optional embodiment, the misappropriation risk identification model can be a real-time identification model, and is mainly used for risk identification of current password modification behavior of a user. If a risk is identified, strong identity verification is performed on the user who wants to modify a password. The sense of security identification model can be an offline identification model, and can identify a user by using a T+1 method (for example, the user is identified by using some user features before a current identification time). If a user is identified as a high-risk user, it indicates that the user has a demand for a sense of security, and strong identity verification needs to be used to enhance the sense of security of the user. The password modification motivation abnormality identification model can identify, in real time, whether the current password modification behavior is appropriate. For example, when the user has actually made a payment by using a password, if the user modifies the password on the same day, the motivation is inappropriate, and strong identity verification should be used.

For other details of this optional embodiment, references can be made to the description in the threshold determining method, and details are omitted here for simplicity.

Figure 4:
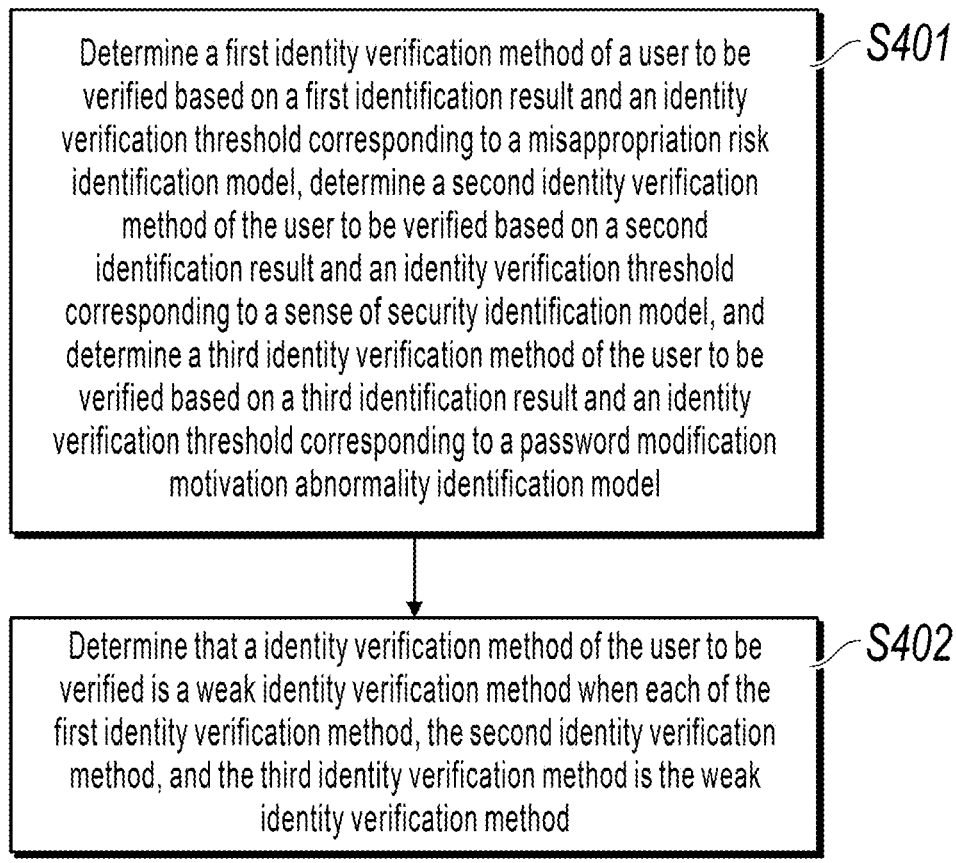
FIG. 4 is a flowchart illustrating step 303, according to an embodiment shown in FIG. 3.

In an optional embodiment of the present embodiment, as shown in FIG. 4, step S303, namely, the step of determining an identity verification method of the user to be verified based on the identification result of the identification model for identity verification and an identity verification threshold corresponding to the identification model for identity verification further includes the following steps S401 and S402:

Step S401: Determine a first identity verification method of the user to be verified based on a first identification result and an identity verification threshold corresponding to the misappropriation risk identification model, determine a second identity verification method of the user to be verified based on a second identification result and an identity verification threshold corresponding to the sense of security identification model, and determine a third identity verification method of the user to be verified based on a third identification result and an identity verification threshold corresponding to the password modification motivation abnormality identification model, where the first identification result, the second identification result, and the third identification result are respectively identification results of the misappropriation risk identification model, the sense of security identification model, and the password modification motivation abnormality identification model for the user to be verified.

Step S402: Determine that the identity verification method of the user to be verified is the weak identity verification method when each of the first identity verification method, the second identity verification method, and the third identity verification method is the weak identity verification method.

In this optional embodiment, the inactive user is identified by using the misappropriation risk identification model, the sense of security identification model, and the password modification motivation abnormality identification model, and weak verification is used for the user to be verified when the identification results of the three identification models all show that the user to be verified is not at risk and the weak identity verification method can be used. The weak identity verification method can be a one-factor identity verification method, namely, a method in which verification is performed by using a single factor such as a mobile phone verification code or an ID number. The strong identity verification method can be a multiple-factor identity verification method. For example, after a user is identified by using an ID number and/or a mobile phone verification code, a method such as a face recognition method is further used. The strong identity verification method has higher verification strength than the weak identity verification method, uses more reliable verification factors, and involves more tedious steps. Through this embodiment of the present embodiment, the range of inactive users can be maximized, and users at risk of account misappropriation, users with a high demand for a sense of security, and users with abnormal password modification motivations can be excluded from the inactive users, and the weak verification method can be used for the remaining inactive users.

As described above, the sense of security identification model is an offline identification mode, can regularly identify a demand of a user for a sense of security, and save an identification result of the sense of security identification model. Therefore, in response to the identity verification request of the user, online identification can be performed on the user by using the misappropriation risk identification model and the password modification motivation abnormality identification model. The identification result of the sense of security identification model can be directly obtained, that is, the identification result of the sense of security identification model for the user can be obtained from a corresponding storage location.

It can be understood that the misappropriation risk identification model and the sense of security identification model are not necessarily used to identify the user when the user requests to modify a password, and can be used to perform identity verification on the user in other scenarios. Specifically, a selection can be made based on an actual situation. Implementations are not limited.

In an optional embodiment of the present embodiment, step S303, namely, the step of determining an identity verification method of the user to be verified based on the identification result of the identification model for identity verification and an identity verification threshold corresponding to the identification model for identity verification further includes the following step: determining that the identity verification method of the user to be verified is the strong identity verification method when at least one of the first identity verification method, the second identity verification method, and the third identity verification method is the strong identity verification method.

In this optional embodiment, if the identification result of any one of the misappropriation risk identification model, the sense of security identification model, and the password modification motivation abnormality identification model shows that the current user to be verified is a user at risk, the strong identity verification method needs to be used, and finally, identity verification is performed on the user by using the strong identity verification method. In other words, if there is any one of risks or abnormalities for the user to be verified, the strong identity verification method is used. As such, user account risks can be minimized.

Apparatus embodiments of the present disclosure are described below, and can be used to execute the method embodiments of the present disclosure.

Figure 5:
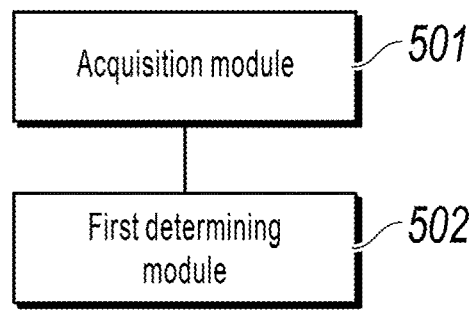
FIG. 5 is a structural block diagram of a threshold determining apparatus, according to an embodiment of the present disclosure.

FIG. 5 is a structural block diagram of a threshold determining apparatus, according to an embodiment of the present disclosure. The apparatus can be implemented as a part or a whole of an electronic device by using software, hardware, or a combination thereof. As shown in FIG. 5, the threshold determining apparatus includes an acquisition module 501 and a first determining module 502.

The acquisition module 501 is configured to obtain predetermined target values respectively corresponding to multiple identification models for identity verification, where the predetermined target values are used to indicate expected target identification capabilities of the identification models for identity verification.

The first determining module 502 is configured to determine user service variable values and identity verification thresholds respectively corresponding to the multiple identification models for identity verification based on the predetermined target values, where the user service variable values are used for classification of active users and inactive users, and the identity verification thresholds are used by the identification models for identity verification to exclude users who need strong verification from the inactive users.

In the present embodiment, the identification model for identity verification can identify, based on a feature of a user and/or a feature of an account, whether there is an identity verification risk for the account of the user. If there is an identity verification risk, strong identity verification is used. Otherwise, weak identity verification is used. That is, the identification model for identity verification is used to identify whether strong verification or weak verification is used to perform identity verification on the account of the user. Strong identity verification refers to a method in which multiple factors are used to verify an identity of a user. Weak identity verification refers to a method in which a single factor or few factors is or are used to verify an identity of a user. The number of factors used in weak identity verification is less than the number of factors used in strong identity verification, and verification strength of weak identity verification is lower than that of strong identity verification. For example, in weak identity verification, factors such as an ID number or a mobile phone SMS verification code are used for verification while in strong identity verification, in addition to an ID number and/or a mobile phone SMS verification code, strong factors such as a face are further used.

The multiple identification models for identity verification can identify an account of a user from multiple different aspects. That is, different identification models for identity verification can identify different identity verification risks of an account based on different features of a user and/or the account, for example, a model for identifying whether an account is misappropriated, a model for identifying a sense of security of a user (there is an identity verification risk if the user has a strong sense of security), and a model for identifying password modification motivation abnormality of a user. The identification model for identity verification can score the account of the user based on the feature of the user and/or the account, and determines the potential risk of the account based on scoring.

The predetermined target value can be a predetermined value related to the target identification capability to be achieved by the identification model for identity verification. That is, the predetermined target value can be considered as a desired value for identification accuracy or an identification error rate of the identification model for identity verification. In an embodiment, the predetermined target value can be desired accuracy of the identification model for identifying users at risk from a plurality of users. In another embodiment, the predetermined target value can be a desired error rate at which the identification model for identity verification cannot identify users at risk from many users. Regardless of whether the predetermined target value is the target identification accuracy or the target identification error rate, the predetermined target value is used to indicate a target desired value of the identification capability of the identification model for identity verification. The predetermined target value can be predetermined based on service experience, a service demand, etc. For example, when a current service involves an account, such as finance, with a high security level, a predetermined target value can be set so as to improve the identification capability of the identification model for identity verification. If a current service involves only an account, such as a forum, with a low security level, another predetermined target value can be set so as to lower the identification capability of the identification model for identity verification.

In the present embodiment, the user service variable values can be used to measure active degrees of users, and users in a current service system can be classified as active users and inactive users. The active users can be users who often perform some operations such as browsing, publishing an article, shopping, and making a payment in the current service system, and the inactive users can be users who have never performed any operations in the current service system or who have performed operations less frequently in a recent period of time. For example, in a third-party payment system, the user service variable values can be set to the number of payments made by users. Larger user service variable values indicate a larger proportion of inactive users, and smaller user service variable values indicate a smaller proportion of inactive users.

In the present embodiment, the identity verification threshold is a threshold of a model score output by the identification model for identity verification. For example, when the identity verification threshold is determined, and the identification model for identity verification is used to identify a user, if an output model score is less than (or greater than) the identity verification threshold, it is considered that the user is not a user at risk, and a weak identity verification can be used. If the output model score is greater than or equal to (or less than or equal to) the identity verification threshold, it is considered that the user is a user at risk, and a strong identity verification method can be used. A value of the identity verification threshold is related to the proportion of users at risk identified by the identification model for identity verification, and is also related to the identification error rate or the identification accuracy of the identification model for identity verification. A larger identity verification threshold indicates a smaller (or larger) proportion of identified users at risk and a higher identification error rate (or a lower identification error rate), and a smaller identity verification threshold indicates a larger (or smaller) proportion of identified users at risk and a lower identification error rate (or a higher identification error rate). Whether the identity verification threshold is directly or inversely proportional to the proportion of users at risk identified by the identification model for identity verification or the identity verification threshold is directly or inversely proportional to the identification error rate (or the identification accuracy) of the identification model for identity verification can be set based on an actual situation. Implementations are not limited.

The user service variable values are used for classification of active users and inactive users. Identity verification methods can include strong identity verification and weak identity verification. To provide better user experience, a common simple method is to use weak verification for inactive users and strong verification for active users. However, there may be some potential risks in such a one-size-fits-all method. Modifying a password is used as an example, and accounts of inactive users may be at risk of misappropriation. If the weak identity verification method is used for all of the inactive users, there may be a risk of misappropriation. Therefore, in the present embodiment of the present disclosure, the inactive users are selected by using the user service variable values (for example, the user service variable values are set to the number of payments made by users within a certain period of time, and if the number of payments is less than a specified value, the user can be considered as an inactive user), then, the users at risk are excluded from the inactive users by using the identification models for identity verification and the identity verification thresholds corresponding to the identification models for identity verification (that is, whether the inactive users are at risk is identified, and a strong verification method is used if there is a risk), and finally, weak verification is performed on the remaining inactive users.

In the existing technology, identity verification thresholds of different identification models for identity verification and the user service variable values are determined separately through experience, testing, etc., and user identification by the different identification models for identity verification is independent of each other. In the present embodiment of the present disclosure, to provide more users with such a high-experience service of weak verification and to minimize risks, the predetermined target values of the identification models for identity verification are predetermined, and the user service variable values and the identity verification thresholds of the identification model for identity verification are determined by using these predetermined target values, so that a range of inactive users for which the weak identity verification method is to be used is maximized while the identification capabilities of the identification models for identity verification can satisfy the predetermined target values. In the present embodiment of the present disclosure, the user service variable values and the identity verification thresholds are determined by using the predetermined target values. As such, the multiple identification models for identity verification and classification of users at risk based on the user service variable values are considered, and a balance is achieved between the identification models for identity verification, which can improve user experience.

In the present embodiment of the present disclosure, in the identity verification process, to achieve a balance between identification results of the multiple different identification models for identity verification for identity verification methods of users, the target identification capabilities to be achieved by the multiple different identification models for identity verification are obtained, and the identity verification thresholds of the identification models for identity verification and the user service variable values used for classification of active users and inactive users are determined based on the target identification capabilities, so that the users at risk can be identified from the inactive users while the range of inactive users is maximized. As such, weak identity verification demands of inactive users can be satisfied, and the users who need strong identity verification can be identified from the inactive users, which can achieve a balance between user experience and risk control.

In an optional embodiment of the present embodiment, the first determining module 502 includes: an optimization submodule, configured to determine the user service variable values and the identity verification thresholds corresponding to the identification models for identity verification by using an optimization algorithm, in order to minimize differences between the identity verification thresholds and the predetermined target values corresponding to the identification models for identity verification, and to maximize a range of inactive users identified based on the user service variable values.

In this optional embodiment, more users are allowed to enjoy the high-experience service of weak identity verification, and it can be ensured as much as possible that users who enjoy the weak identity verification service are risk-free users (the risk-free users can be understood as users who should use strong verification, for example, users who misappropriate accounts of others and users who need strong verification due to lack of a sense of security). To achieve a balance between a high user experience and a low risk, in the present embodiment of the present disclosure, the predetermined target value of each identification model for identity verification is predetermined. The predetermined target value is used to indicate the expected identification capability of the identification model for identity verification, and the identification capability of the trained identification model for identity verification can be adjusted by using the identity verification threshold. The identification model for identity verification identifies a feature of a user and/or a feature of a user account to yield a model score, and a value of the model score is related to a risk level of the user. The identity verification threshold can be set to be between a maximum value and a minimum value of the model score. When a higher model score indicates a higher risk level of the user, a larger identity verification threshold is set, and the identification model for identity verification has a poorer identification capability (or when a higher model score indicates a lower risk level of the user, a smaller identity verification threshold is set, and the identification model for identity verification has a poorer identification capability). On contrary, when a smaller identity verification threshold is set, the identification model for identity verification has a higher identification capability. Therefore, an optimal identity verification threshold can be found for the identification model for identity verification, so that the identification capability of the identification model for identity verification can be as close to the predetermined target value as possible. In the present disclosure, the multiple identification models for identity verification are used to identify inactive users, and it is expected to provide more inactive users with the weak identity verification service. Therefore, the identity verification threshold of the identification model for identity verification is neither simply set to the predetermined target value, nor the user service variable values are directly set through experience, statistics collection, etc. Instead, the user service variable values and the multiple identity verification thresholds respectively corresponding to the multiple identification models for identity verification are optimized by using the optimization algorithm, and optimized user service variable values and multiple optimized identity verification thresholds can achieve a balance between user experience and a low risk level of a user.

In the present embodiment of the present disclosure, the process of optimizing the user service variable values and the multiple identity verification thresholds respectively corresponding to the multiple identification models for identity verification, minimizing the differences between the identity verification thresholds and the corresponding predetermined target values and maximizing the range of inactive users identified based on the user service variable values are used as an objective of the optimization algorithm, the user service variable values and the identity verification thresholds are obtained through optimization by using the optimization algorithm. In an embodiment, the optimization algorithm can be a particle swarm optimization (PSO) algorithm. The PSO algorithm is a swarm-based stochastic optimization technology, and simulates the swarm behavior of insects, beasts, birds, fishes, etc. These groups look for food in a cooperative way. Each member of the group changes its search pattern based on its own experience and experience of other members. That is, in the present disclosure, the PSO algorithm is used, the user service variable values, different values of an objective function that includes the identity verification thresholds are used as particles in a swarm, and an optimal value of each particle in target space is optimized through continuous iteration. In each iteration process, an optimal value of a particle is identified from both the perspective of the swarm and the perspective of the individual, and finally, an optimal value of the particle in the target space from both the perspective of the swarm and the perspective of the individual is identified. Based on the user service variable values and the identity verification thresholds obtained through optimization by using this algorithm, the range of inactive users who are to use weak identity verification can be maximized, and users at risk can be identified from the inactive users. Therefore, a balance is achieved between user experience and account risk.

In other embodiments, other optimization algorithms for alleviating similar problems, for example, an ant colony optimization (ACO) algorithm and a differential evolution algorithm, can be used, and can be selected based on actual situations. Implementations are not limited here.

Figure 6:
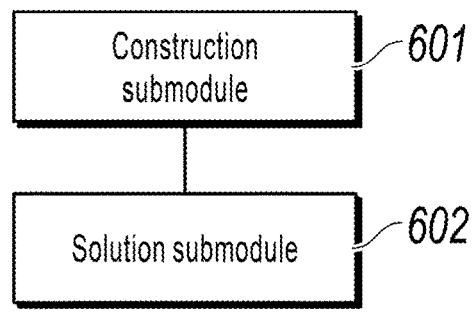
FIG. 6 is a structural block diagram of an optimization algorithm in a threshold determining apparatus, according to an embodiment of the present disclosure.

In an optional embodiment of the present embodiment, as shown in FIG. 6, the optimization submodule includes: a construction submodule 601, configured to construct a solution vector by using the user service variable values and the identity verification thresholds respectively corresponding to the multiple identification models for identity verification; and a solution submodule 602, configured to solve the solution vector based on using maximizing the range of inactive users identified based on the user service variable values as a condition of the optimization algorithm and by using an objective function, of the optimization algorithm, that the identity verification thresholds corresponding to the multiple identification models for identity verification are less than the predetermined target values corresponding to the multiple identification models for identity verification.

In this optional embodiment, the solution vector can be constructed by using the user service variable values and the identity verification thresholds corresponding to the identification models for identity verification as variables. For example, the user service variable values are denoted as C, and the identity verification threshold of the identification model i for identity verification is denoted as $Y_i$ ($i \geq 1$). In this case, the solution vector can be denoted as $S=[C, Y_1, Y_2, \ldots, Y_i, \ldots]$. After the optimization algorithm is selected, maximizing the range of inactive users identified based on the user service variable values is used as the condition of the optimization algorithm, and that the multiple identity verification thresholds are less than the corresponding predetermined target values is used as the objective function, and the user service variable values and the identity verification thresholds are determined by executing the optimization algorithm. In the execution process of the optimization algorithm, under the premise that the maximization of user service variable values is ensured (this is suitable for a case in which larger user service variable values indicate a wider range of inactive users identified. On the contrary, when smaller user variable values indicate a narrower range of inactive users identified, minimizing the user service variable values needs to be used as the condition), each identity verification threshold is less than the predetermined target value, and is infinitely close to the predetermined target value. For example, when the PSO algorithm is used for optimization, if the constructed vector is $S=[C, Y1, Y2, \ldots, Yi, \ldots]$, an adaptive value function can be constructed as $p=C-(Y1-y1)-(Y2-y2)-\ldots-(Yi-yi)-\ldots$ (This is merely an example, and the function can be constructed based on an actual situation), where y1, y2, ..., yi, ... respectively represent predetermined target values of identification models 1, 2, ..., i, ... for identity verification. In the PSO optimization algorithm, a value of p is identified, so that the value is optimal in both a group and the individual. After p is updated by using an update function, the previous step is iteratively performed until an iteration termination condition (for example, the number of iterations reaches a predetermined threshold) is reached. Finally obtained C and Yi corresponding to p are optimal solutions to the user service variable values and the identity verification threshold.

In an optional embodiment of the present embodiment, the identification models for identity verification include a misappropriation risk identification model, a sense of security identification model, and/or a password modification motivation abnormality identification model, where the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

In the present embodiment, the misappropriation risk identification model can be a real-time identification model, and is mainly used for risk identification of current password modification behavior of a user. If a risk is identified, strong identity verification is performed on the user who wants to modify a password. The sense of security identification model can be an offline identification model, and can identify a user by using a T+1 method (for example, the user is identified by using some user features before a current identification time). If a user is identified as a high-risk user, it indicates that the user has a demand for a sense of security, and strong identity verification needs to be used to enhance the sense of security of the user. The password modification motivation abnormality identification model can identify, in real time, whether the current password modification behavior is appropriate. For example, when the user has actually made a payment by using a password, if the user modifies the password on the same day, the motivation is inappropriate, and strong identity verification should be used. Both the misappropriation risk identification model and the sense of security identification model can be built through supervised learning such as GBDT, RandomForest, and logistic regression. The password modification motivation abnormality identification model can be an unsupervised learning model. A risk can be identified by describing behavior abnormality such as one-class SVM. Through the combination of one or more of the previous three identification models for identity verification, the users at risk can be excluded from the inactive users. As such, risk problems brought by weak identity verification are alleviated while it is ensured that more inactive users enjoy the weak verification service.

The misappropriation risk identification model identifies a user by using a misappropriation risk feature of the user. The misappropriation risk feature is used to describe a variable within the model for account misappropriation risks, for example, to describe abnormality in the device dimension, the environment dimension and the user operation dimension, or various other aspects.

The sense of security identification model identifies a user by using a sense of security risk feature. The sense of security risk feature is used to describe a demand of the user for a sense of security, and can include two types. One type is a text feature such as a historical incoming call feedback or text feedback of the user. The other type is a behavioral feature such as a feature indicating whether the user has a historical habit of periodically modifying a password and a feature indicating whether the user performs unbinding after card binding.

The password modification motivation abnormality identification model identifies a user by using a password modification motivation feature. The password modification motivation feature describes whether the user really forgets a password, and for example, can include behavioral features such as a feature indicating whether a payment has been made by using the password in a short time before current password modification and a feature indicating that password modification has been made for multiple accounts on the same device.

The user service variable values and the features needed by the identification models for identity verification to perform identity verification on the users can be obtained from the following data: user information data, historical transaction data, historical case information, and public opinion information.

The user information data includes user information such as a user ID, a user registration time, and a user identity card.

The historical transaction data includes historical transactions of a user, including a transaction number, a transaction time, and an amount corresponding to a user ID. Detailed information such as a transaction device, an IP, and Wi-Fi at a transaction moment can be obtained through underlying association.

The historical case information includes information about a user on a misappropriation case, a sense of security questionnaire, etc. Account misappropriation means that an account is operated by an unauthorized user for a payment, and the authorized user makes a complaint or reports a case after finding account misappropriation. This part of data is usually used as sample labels for supervised learning during modeling. The security questionnaire is a sampling or directional data survey conducted to obtain a demand of a user for a sense of security. Like the misappropriation case information, the security questionnaire is usually used as sample labels for supervised learning during modeling.

The public opinion information includes features of main users who historically trigger public opinion and features of public opinion about the users, for example, incoming call feedbacks of the users or behavioral data, features such as attempting to modify a password, unbinding bank card, and deleting friends, of the users in this period of time.

Figure 7:
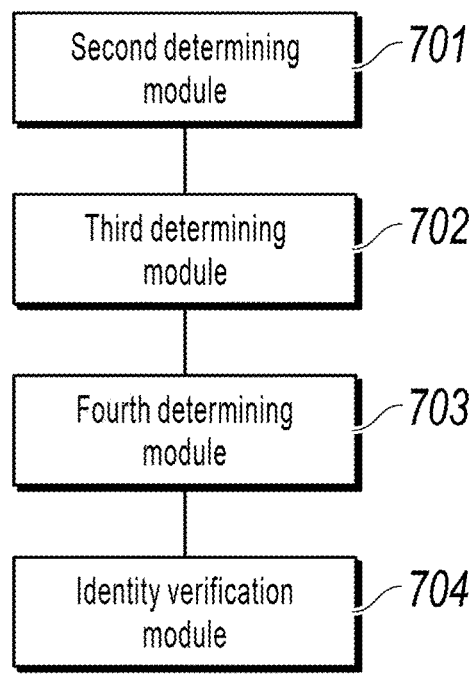
FIG. 7 is a structural block diagram of an identity verification apparatus, according to an embodiment of the present disclosure.

FIG. 7 is a structural block diagram of an identity verification apparatus, according to an embodiment of the present disclosure. The apparatus can be implemented as a part or a whole of an electronic device by using software, hardware, or a combination thereof. As shown in FIG. 7, the identity verification apparatus includes a second determining module 701, a third determining module 702, a fourth determining module 703, and an identity verification module 704.

The second determining module 701 is configured to determine, based on user service variable values in response to an identity verification request, whether a user to be verified is an inactive user.

The third determining module 702 is configured to determine an identification result of at least one of multiple identification models for identity verification for the user to be verified when the user to be verified is an inactive user.

The fourth determining module 703 is configured to determine an identity verification method of the user to be verified based on the identification result of the identification model for identity verification and an identity verification threshold corresponding to the identification model for identity verification, where the identity verification method includes a weak identity verification method and a strong identity verification method, and the user service variable values and the identity verification threshold are obtained by using the previous threshold determining apparatus.

The identity verification module 704 is configured to perform identity verification on the user to be verified by using the identity verification method.

In the present embodiment, after the user service variable values and the identity verification threshold of the identification model for identity verification are obtained by using the threshold determining apparatus, if the request for performing identity verification on a user account is received, whether the user to be verified is an inactive user can be first determined by using the user service variable values, and if the user to be verified is an inactive user, the user is identified by using the identification model for identity verification to determine whether the user is a user at risk in inactive users. Password modification behavior is used as an example to determine whether the user who is currently requesting to modify a password is stealing the account. For another example, it is determined whether the current user to be verified is a user who has a high demand for a sense of security and does not want weak verification to be performed. The identification model for identity verification scores the user to be verified for a feature corresponding to the user, and whether the user to be verified is at risk is determined by comparing a score with the identity verification threshold corresponding to the identification model for identity verification. If there is a risk, the strong identity verification method is used. If identification results of the one or more used identification models for identity verification for the user to be verified all show that the user to be verified is not at risk, the weak identity verification method is used.

For some technical details of the present embodiment, references can be made to the description in the threshold determining apparatus, and details are omitted here for simplicity.

In the present embodiment of the present disclosure, the user is identified by using the user service variable values and the identity verification threshold obtained through optimization by using the threshold determining apparatus and the identification model for identity verification, to determine whether to use the strong identity verification method or the weak identity verification method for the user. In this method, users at risk can be identified from the inactive users while a range of inactive users can be maximized. As such, weak identity verification demands of inactive users can be satisfied, and users who need strong identity verification can be identified from the inactive users, which can achieve a balance between user experience and risk control.

In an optional embodiment of the present embodiment, the identification models for identity verification include a misappropriation risk identification model, a sense of security identification model, and/or a password modification motivation abnormality identification model, where the misappropriation risk identification model is used to identify the possibility of account misappropriation, the sense of security identification model is used to identify a user demand for the degree of account security, and the password modification motivation abnormality identification model is used to identify the possibility of behavior abnormality of the user when modifying a password.

In this optional embodiment, the misappropriation risk identification model can be a real-time identification model, and is mainly used for risk identification of current password modification behavior of a user. If a risk is identified, strong identity verification is performed on the user who wants to modify a password. The sense of security identification model can be an offline identification model, and can identify a user by using a T+1 method (for example, the user is identified by using some user features before a current identification time). If a user is identified as a high-risk user, it indicates that the user has a demand for a sense of security, and strong identity verification needs to be used to enhance the sense of security of the user. The password modification motivation abnormality identification model can identify, in real time, whether the current password modification behavior is appropriate. For example, when the user has actually made a payment by using a password, if the user modifies the password on the same day, the motivation is inappropriate, and strong identity verification should be used.

For other details of this optional embodiment, references can be made to the description in the threshold determining apparatus, and details are omitted here for simplicity.

Figure 8:
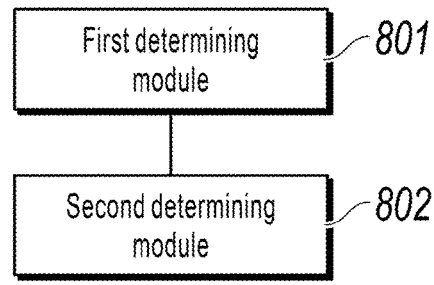
FIG. 8 is a schematic structural diagram of a fourth determining module 703, according to an embodiment shown in FIG. 7.

In an optional embodiment of the present embodiment, as shown in FIG. 8, the fourth determining module 703 includes: a first determining submodule 801, configured to determine a first identity verification method of the user to be verified based on a first identification result and an identity verification threshold corresponding to the misappropriation risk identification model, determine a second identity verification method of the user to be verified based on a second identification result and an identity verification threshold corresponding to the sense of security identification model, and determine a third identity verification method of the user to be verified based on a third identification result and an identity verification threshold corresponding to the password modification motivation abnormality identification model, where the first identification result, the second identification result, and the third identification result are respectively identification results of the misappropriation risk identification model, the sense of security identification model, and the password modification motivation abnormality identification model for the user to be verified; and a second determining submodule 802, configured to determine that the identity verification method of the user to be verified is the weak identity verification method when each of the first identity verification method, the second identity verification method, and the third identity verification method is the weak identity verification method.

In this optional embodiment, the inactive user is identified by using the misappropriation risk identification model, the sense of security identification model, and the password modification motivation abnormality identification model, and weak verification is used for the user to be verified when the identification results of the three identification models all show that the user to be verified is not at risk and the weak identity verification method can be used. The weak identity verification method can be a one-factor identity verification method, namely, a method in which verification is performed by using a single factor such as a mobile phone verification code or an ID number. The strong identity verification method can be a multiple-factor identity verification method. For example, after a user is identified by using an ID number and/or a mobile phone verification code, a method such as a face recognition method is further used. The strong identity verification method has higher verification strength than the weak identity verification method, uses more reliable verification factors, and involves more tedious steps. Through this embodiment of the present embodiment, the range of inactive users can be maximized, and users at risk of account misappropriation, users with a high demand for a sense of security, and users with abnormal password modification motivations can be excluded from the inactive users, and the weak verification method can be used for the remaining inactive users.

As described above, the sense of security identification model is an offline identification mode, can regularly identify a demand of a user for a sense of security, and save an identification result of the sense of security identification model. Therefore, in response to the identity verification request of the user, online identification can be performed on the user by using the misappropriation risk identification model and the password modification motivation abnormality identification model. The identification result of the sense of security identification model can be directly obtained, that is, the identification result of the sense of security identification model for the user can be obtained from a corresponding storage location.

It can be understood that the misappropriation risk identification model and the sense of security identification model are not necessarily used to identify the user when the user requests to modify a password, and can be used to perform identity verification on the user in other scenarios. Specifically, a selection can be made based on an actual situation. Implementations are not limited.

In an optional embodiment of the present embodiment, the fourth determining module 703 further includes: a third determining submodule, configured to determine that the identity verification method of the user to be verified is the strong identity verification method when at least one of the first identity verification method, the second identity verification method, and the third identity verification method is the strong identity verification method.

In this optional embodiment, if the identification result of any one of the misappropriation risk identification model, the sense of security identification model, and the password modification motivation abnormality identification model shows that the current user to be verified is a user at risk, the strong identity verification method needs to be used, and finally, identity verification is performed on the user by using the strong identity verification method. In other words, if there is any one of risks or abnormalities for the user to be verified, the strong identity verification method is used. As such, user account risks can be minimized.

Figure 9:
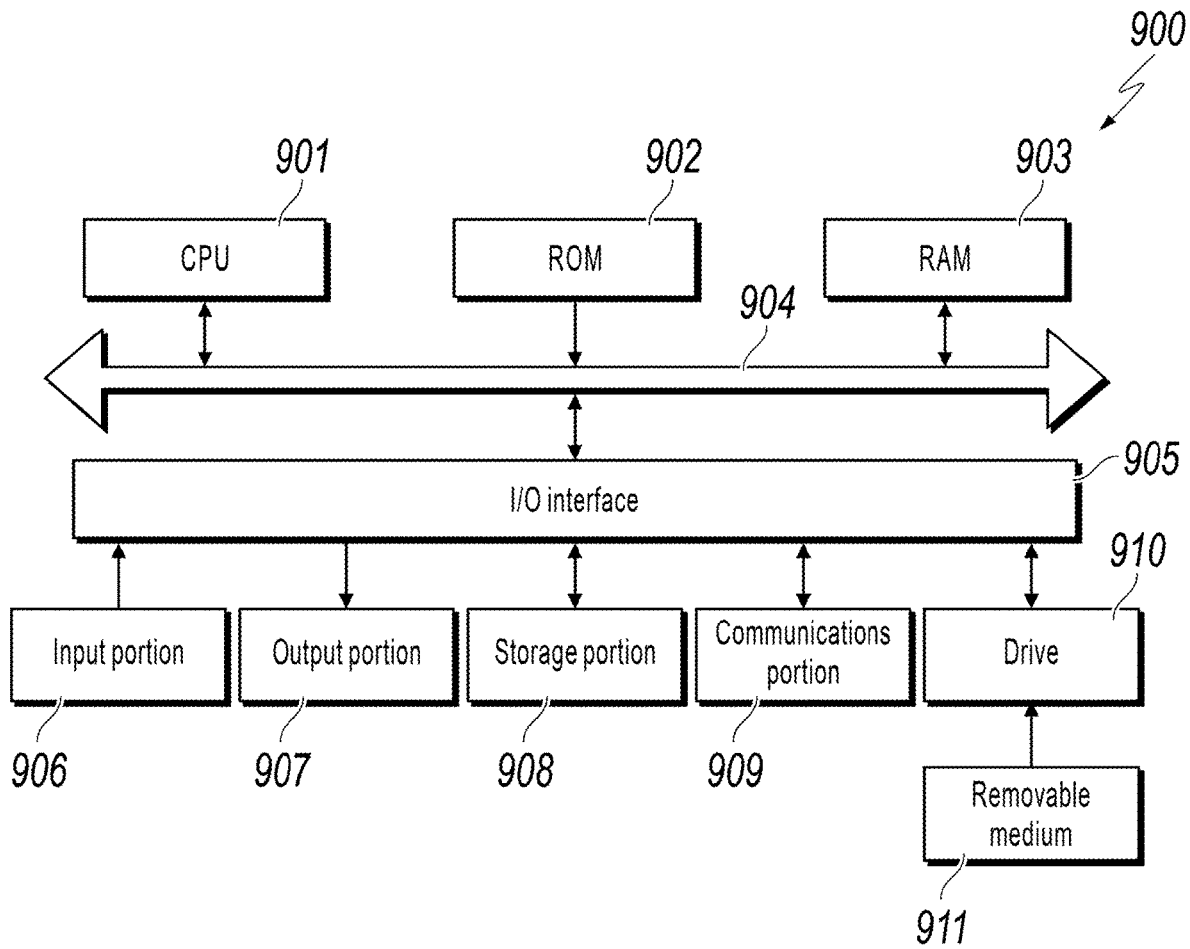
FIG. 9 is a schematic structural diagram of an electronic device configured to implement a threshold determining method, according to an embodiment of the present disclosure.

FIG. 9 is a schematic structural diagram of an electronic device configured to implement a threshold determining method, according to an embodiment of the present disclosure.

As shown in FIG. 9, the electronic device 900 includes a central processing unit (CPU) 901. The central processing unit can perform various types of processing in the embodiment shown in FIG. 1 based on a program stored in a read-only memory (ROM) 902 or a program loaded from a storage portion 908 into a random access memory (RAM) 903. The RAM 903 further stores various programs and data needed for the operation of the electronic device 900. The CPU 901, the ROM 902, and the RAM 903 are connected to each other by using a bus 904. An input/output (I/O) interface 905 is also connected to the bus 904.

The following parts are connected to the I/O interface 905: an input portion 906 including a keyboard, a mouse, etc., an output portion 907 including a cathode ray tube (CRT), a liquid crystal display (LCD), a speaker, etc., the storage portion 908 including a hard disk, etc., and a communications portion 909 including a network interface card such as a LAN card or a modem. The communications portion 909 performs communication processing via a network such as the Internet. A drive 910 is also connected to the I/O interface 905 as needed. A removable medium 911 such as a magnetic disk, an optical disk, a magneto-optical disk, or a semiconductor memory is installed in the drive 910 as needed, to facilitate installation of computer programs read from the drive 910 into the storage portion 908 as needed.

In particular, according to some embodiments of the present disclosure, the method described above with reference to FIG. 1 can be implemented as a computer software program. For example, an embodiment of the present disclosure includes a computer program product. The computer program product includes a computer program physically included in a readable medium of the computer program product, and the computer program includes program code for performing the method in FIG. 1. In such an embodiment, the computer program can be downloaded from and installed in a network by using the communications portion 909, and/or installed in the removable medium 911.

The electronic device shown in FIG. 9 is also suitable for implementing the identity verification method in some embodiments of the present disclosure.

The flowcharts and block diagrams in the accompanying drawings show possible embodiment architectures, functions, and operations of the system, the method, and the computer program product according to some embodiments of the present disclosure. In this regard, each block in the flowchart or block diagram can represent a part of one module, program segment, or code. The part of the module, program segment, or code includes one or more executable instructions for implementing a specified logical function. It should also be noted that in some alternative embodiments, the functions noted in the blocks can be executed in an order different from that noted in the accompanying drawings. For example, two consecutive blocks can actually be executed substantially in parallel, or two consecutive blocks can sometimes be executed in a reverse order, and this depends on functions involved. It is worthwhile to further note that each block in the block diagrams and/or flowcharts and a combination of blocks in the block diagrams and/or flowcharts can be implemented by using a dedicated hardware-based system for executing a specified function or operation, or can be implemented by using a combination of dedicated hardware and a computer instruction.

The units or modules in some embodiments of the present disclosure can be implemented by software or hardware. The described units or modules can be disposed in a processor, and the names of these units or modules constitute no limitation on the units or modules in certain cases.

In another aspect, the present disclosure further provides a computer-readable storage medium. The computer-readable storage medium can be a computer-readable storage medium included in the apparatus in the previous embodiment, and can be a computer-readable storage medium that exists separately and is not assembled into a device. The computer-readable storage medium stores one or more programs. The one or more programs are executed by one or more processors to perform the methods described in the present disclosure.

The previous description is merely preferred embodiments of the present disclosure and description of the used technical principles. A person skilled in the art should understand that the specification scope involved in the present disclosure is not limited to a technical solution formed by a specific combination of the previous technical features, but should further include other technical solutions formed by any combination of the previous technical features or equivalent features without departing from the inventive concept, for example, technical solutions formed by replacing the previous features with (but not limited to) the technical features with similar functions disclosed in the present disclosure.

What is claimed is:

1. A computer-implemented method for identity verification, the method comprising:
    receiving an identity verification request for verifying an identity of a user;
    determining a user service variable value and at least one identity verification threshold based on a user identification capability expectation, wherein the user service variable value and the at least one identity verification threshold are determined based on executing an optimization algorithm that minimizes a difference between the at least one identity verification threshold and the user identification capability expectation and maximizes a number of inactive users based on the user service variable value;
    determining that the user is an inactive user based on the user service variable value;
    determining at least one risk level of the user based on at least one user identification method; and
    identifying a user identity verification method based on the at least one risk level and the at least one identity verification threshold corresponding to the at least one user identification method, wherein the user identity verification method is one of a first user identity verification method or a second user identity verification method, wherein the first user identity verification method requires more factors for verification than the second user identity verification method.

2. The computer-implemented method of claim 1, wherein the optimization algorithm is executed by:
    constructing a solution vector based on the user service variable value and the at least one identity verification threshold; and
    solving the solution vector by using maximizing the number of inactive users as an optimization condition and minimizing the difference between the at least one identity verification threshold and the user identification capability expectation as an objective function.

3. The computer-implemented method of claim 1, wherein the at least one user identification method includes a misappropriation risk identification method that identifies a possibility of user account misappropriation, a sense of security identification method that identifies a user's account security demand, or an abnormal password activity identification method that identifies suspicious password related activities.

4. The computer-implemented method of claim 3, wherein the at least one risk level includes a first risk level determined based on the misappropriation risk identification method, a second risk level determined based on the sense of security identification method, a third risk level determined based on the abnormal password activity identification method, and determining the user identity verification method further comprises:
    determining that a first condition is satisfied based on that the first risk level satisfies a first identity verification threshold corresponding to the misappropriation risk identification method;
    determining that a second condition is satisfied based on that the second risk level satisfies a second identity verification threshold corresponding to the sense of security identification method; and
    determining that a third condition is satisfied based on that the third risk level satisfies a third identity verification threshold corresponding to the abnormal password activity identification method.

5. The computer-implemented method of claim 4, wherein the user identity verification method is the first user identity verification method if at least one of the first condition, the second condition, or the third condition is satisfied.

6. The computer-implemented method of claim 4, wherein the user identity verification method is the second user identity verification method if the first condition, the second condition, and the third condition are satisfied.

7. A non-transitory, computer-readable medium storing one or more instructions executable by a computer system to perform operations for identity verification, the operations comprising:
    receiving an identity verification request for verifying an identity of a user;
    determining a user service variable value and at least one identity verification threshold based on a user identification capability expectation, wherein the user service variable value and the at least one identity verification threshold are determined based on executing an optimization algorithm that minimizes a difference between the at least one identity verification threshold and the user identification capability expectation and maximizes a number of inactive users based on the user service variable value;
    determining that the user is an inactive user based on the user service variable value;
    determining at least one risk level of the user based on at least one user identification method; and
    identifying a user identity verification method based on the at least one risk level and the at least one identity verification threshold corresponding to the at least one user identification method, wherein the user identity verification method is one of a first user identity verification method or a second user identity verification method, wherein the first user identity verification method requires more factors for verification than the second user identity verification method.

8. The non-transitory, computer-readable medium of claim 7, wherein the optimization algorithm is executed by:
constructing a solution vector based on the user service variable value and the at least one identity verification threshold; and
solving the solution vector by using maximizing the number of inactive users as an optimization condition and minimizing the difference between the at least one identity verification threshold and the user identification capability expectation as an objective function.

9. The non-transitory, computer-readable medium of claim 7, wherein the at least one user identification method includes a misappropriation risk identification method that identifies a possibility of user account misappropriation, a sense of security identification method that identifies a user's account security demand, or an abnormal password activity identification method that identifies suspicious password related activities.

10. The non-transitory, computer-readable medium of claim 9, wherein the at least one risk level includes a first risk level determined based on the misappropriation risk identification method, a second risk level determined based on the sense of security identification method, a third risk level determined based on the abnormal password activity identification method, and determining the user identity verification method further comprises:
determining that a first condition is satisfied based on that the first risk level satisfies a first identity verification threshold corresponding to the misappropriation risk identification method;
determining that a second condition is satisfied based on that the second risk level satisfies a second identity verification threshold corresponding to the sense of security identification method; and
determining that a third condition is satisfied based on that the third risk level satisfies a third identity verification threshold corresponding to the abnormal password activity identification method.

11. The non-transitory, computer-readable medium of claim 10, wherein the user identity verification method is the first user identity verification method if at least one of the first condition, the second condition, or the third condition is satisfied.

12. The non-transitory, computer-readable medium of claim 10, wherein the user identity verification method is the second user identity verification method if the first condition, the second condition, and the third condition are satisfied.

13. A computer-implemented system for identity verification, comprising:
one or more computers; and
one or more computer memory devices interoperable coupled with the one or more computers and having tangible, non-transitory, machine-readable media storing one or more instructions that, when executed by the one or more computers, perform one or more operations comprising:
receiving an identity verification request for verifying an identity of a user;
determining a user service variable value and at least one identity verification threshold based on a user identification capability expectation, wherein the user service variable value and the at least one identity verification threshold are determined based on executing an optimization algorithm that minimizes a difference between the at least one identity verification threshold and the user identification capability expectation and maximizes a number of inactive users based on the user service variable value;
determining that the user is an inactive user based on the user service variable value;
determining at least one risk level of the user based on at least one user identification method; and
identifying a user identity verification method based on the at least one risk level and the at least one identity verification threshold corresponding to the at least one user identification method, wherein the user identity verification method is one of a first user identity verification method or a second user identity verification method, wherein the first user identity verification method requires more factors for verification than the second user identity verification method.

14. The computer-implemented system of claim 13, wherein the optimization algorithm is executed by:
constructing a solution vector based on the user service variable value and the at least one identity verification threshold; and
solving the solution vector by using maximizing the number of inactive users as an optimization condition and minimizing the difference between the at least one identity verification threshold and the user identification capability expectation as an objective function.

15. The computer-implemented system of claim 13, wherein the at least one user identification method includes a misappropriation risk identification method that identifies a possibility of user account misappropriation, a sense of security identification method that identifies a user's account security demand, or an abnormal password activity identification method that identifies suspicious password related activities.

16. The computer-implemented system of claim 15, wherein the at least one risk level includes a first risk level determined based on the misappropriation risk identification method, a second risk level determined based on the sense of security identification method, a third risk level determined based on the abnormal password activity identification method, and determining the user identity verification method further comprises:
determining that a first condition is satisfied based on that the first risk level satisfies a first identity verification threshold corresponding to the misappropriation risk identification method;
determining that a second condition is satisfied based on that the second risk level satisfies a second identity verification threshold corresponding to the sense of security identification method; and
determining that a third condition is satisfied based on that the third risk level satisfies a third identity verification threshold corresponding to the abnormal password activity identification method.

17. The computer-implemented system of claim 16, wherein the user identity verification method is the first user identity verification method if at least one of the first condition, the second condition, or the third condition is satisfied.

18. The computer-implemented system of claim 16, wherein the user identity verification method is the second user identity verification method if the first condition, the second condition, and the third condition are satisfied.

\* \* \* \* \*

UNITED STATES PATENT AND TRADEMARK OFFICE
CERTIFICATE OF CORRECTION

PATENT NO. : 11,074,336 B2  
APPLICATION NO. : 17/085261  
DATED : July 27, 2021  
INVENTOR(S) : Yu Cheng et al.

Page 1 of 1

It is certified that error appears in the above-identified patent and that said Letters Patent is hereby corrected as shown below:

In the Claims

Column 31, Line 54, Claim 13, delete "interoperable" and insert -- interoperably --, therefor.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*